(12) United States Patent
Hull et al.

(10) Patent No.: US 7,633,203 B2
(45) Date of Patent: Dec. 15, 2009

(54) DAMPING AND SUPPORT IN HIGH-TEMPERATURE SUPERCONDUCTING LEVITATION SYSTEMS

(75) Inventors: John R. Hull, Sammamish, WA (US); Carl R. McIver, Everett, WA (US); John A. Mittleider, Kent, WA (US)

(73) Assignee: The Boeing Company, Chicago, IL (US)

(*) Notice: Subject to any disclaimer, the term of this patent is extended or adjusted under 35 U.S.C. 154(b) by 74 days.

(21) Appl. No.: 11/968,350

(22) Filed: Jan. 2, 2008

(65) Prior Publication Data
US 2009/0170707 A1 Jul. 2, 2009

(51) Int. Cl.
*F16C 32/04* (2006.01)
*H01F 6/00* (2006.01)

(52) U.S. Cl. ............ 310/90.5; 335/216; 505/166

(58) Field of Classification Search ............ 361/141, 361/144; 335/216; 505/163, 166; 310/90.5
See application file for complete search history.

(56) References Cited

U.S. PATENT DOCUMENTS

| | | | | |
|---|---|---|---|---|
| 4,939,120 A | * | 7/1990 | Moon et al. | 505/166 |
| 5,099,216 A | * | 3/1992 | Pelrine | 335/220 |
| 5,567,672 A | * | 10/1996 | Terentiev et al. | 505/166 |
| 6,737,777 B2 | * | 5/2004 | Werfel et al. | 310/90.5 |
| 2002/0050755 A1 | * | 5/2002 | Werfel et al. | 310/90.5 |

FOREIGN PATENT DOCUMENTS

JP    06081843 A  *  3/1994

* cited by examiner

*Primary Examiner*—Ramon M Barrera
(74) *Attorney, Agent, or Firm*—Canady & Lortz LLP; Bradley K. Lortz

(57) ABSTRACT

Methods and apparatuses to provide improved auxiliary damping for superconducting bearings in superconducting levitation systems are disclosed. In a superconducting bearing, a cryostat housing the superconductors is connected to a ground state with a combination of a damping strip of material, a set of linkage arms to provide vertical support, and spring washers to provide stiffness. Alternately, the superconducting bearing may be supported by a cryostat connected to a ground state by posts constructed from a mesh of fibers, with the damping and stiffness controlled by the fiber composition, size, and mesh geometry.

24 Claims, 10 Drawing Sheets

DAMPING AND SUPPORT IN HIGH-TEMPERATURE SUPERCONDUCTING LEVITATION SYSTEMS

STATEMENT OF GOVERNMENT RIGHTS

This disclosure was made with Government support under contract No. DE-FC3699-GO10285 awarded by the Department of Energy. The Government has certain rights in this disclosure.

CROSS-REFERENCE TO RELATED APPLICATION

This application is related to U.S. patent application Ser. No. 11/745,376, by John R. Hull filed May 7, 2007, and entitled "IMPROVED DAMPING IN HIGH-TEMPERATURE SUPERCONDUCTING LEVITATION SYSTEMS".

BACKGROUND

1. Technical Field

This disclosure relates to damping in superconducting levitation systems. Particularly, this disclosure relates to damping in high-temperature superconducting bearings in levitation systems, such as used to support a flywheel energy storage system.

2. Description of the Related Art

Superconducting levitation systems, and specifically those employing superconducting bearings, are typically implemented with a superconducting stator (non levitated component) and a permanent magnet rotor (or levitated component). The superconductor is most commonly a bulk, high-temperature superconductor. Superconducting bearings of this type are useful because they can be used to form a passively stable levitation system with extremely low rotational losses. Such bearings have particular application to high-efficiency flywheel energy-storage devices. Superconducting bearings and high-efficiency flywheels have been subjects of past developments.

FIG. 1A illustrates a conventional permanent magnet high-temperature superconducting levitation system 100. The superconductor element 102 (such as a stator) is coupled to a cold source 104 which maintains its temperature at a level to support superconductivity. A thermal insulator 106 isolates and supports the superconductor element 102 and the cold source 104 relative to a ground state 108. A magnetic field generated by the superconductor element 102 supports the permanent magnet 110 (e.g., a rotor spinning at rate ω) levitating it above the superconductor element 102 with force F. In this example system 100, the permanent magnet 110 may be coupled to a larger structure and may comprise a more complex magnetic structure. The high-temperature superconductor element 102 may comprise one or more bulk crystals of yttrium barium copper oxide (YBCO) or any other known high-temperature superconductor material. Due to flux pinning in the high-temperature superconductor, the orientation of the central axis may be in any direction. For example, the permanent magnet could rotate below the high-temperature superconductor.

FIG. 1B illustrates another example of a conventional permanent magnet high-temperature superconducting levitation system 120. In this example, the permanent magnet 122 is shown levitated in vacuum enclosed by the surrounding vacuum chamber 124. The high-temperature superconductor 126 is situated inside a cryochamber 128 on a support 134 and bathed in a pool liquid nitrogen 130. One or more low thermal conductance mechanical supports 132 separate the cryochamber 128 that houses the high-temperature superconductor 126 from the fixed support 136 of the environment. The supply of liquid nitrogen may be regulated in some way through an inlet 138 and outlet 140 (e.g., fed via a pressure regulator from a pressurized Dewar, part of a thermosiphon loop, etc.). The cryogenic chamber 128 should be thermally isolated from the environment. It resides in a substantial vacuum, and radiation losses may be reduced by wrapping the chamber 128 with one or more layers of multi-layered insulation (MLI). MLI is typically a very thin sheet of mylar film with an even thinner film of aluminum evaporated onto it as is known in the art. The use of MLI is a standard practice in cryogenic technology. In addition, the mechanical supports 132 that connect the cryogenic chamber to the fixed support 136 of the environment should be of low thermal conductance; the thermal conduction of heat through the supports 132 should be reduced while continuing to provide sufficient mechanical strength.

In prior art systems, the supporting structures are rigid; the coupling between the holder and the ground is modeled as perfectly rigid because the stiffness is so high. It is convenient to make this stiffness high, because a center of geometry is defined for the system in doing so. As a consequence, there is the equivalent of a relatively stiff spring between the actual surface that holds the superconductor element and the ground. Most other mechanical bearing systems can not tolerate the large radial excursion that a superconducting bearing can, so movement is restricted in conventional systems. The stiff spring results in a high resonant frequency for vibrations of the superconductor element holder relative to ground. There is also a small amount of structural damping inherent in this rigid structure. When applied to the levitation system as a whole, the damping to the superconductor element holder is small. In addition, because the resonant frequency between the superconductor element holder and ground is higher than the resonant frequency between of the superconductor element holder and the magnet, any coupling of this damping to the levitated magnet is small.

One general difficulty in developing superconducting bearings and supercondcuting levitation systems arises from the inherently low damping of the bearing itself, especially at small vibrational amplitudes. The primary damping in a superconducting levitational system is due to magnetic hysteresis in the superconductor. To a first order, the cyclic energy loss of the system is proportional to the cube of the displacement from equilibrium and inversely proportional to the critical current density of the superconductor. Large cricial current densities are desirable to increase the levitational force and to decrease the amount of superconductor required. This system is particularly ineffective at damping small amplitude oscillations and whirls of levitated rotors.

Techniques to increase damping, such as applying eddy current dampers, can be used with superconducting bearings. For example, eddy current dampers could be employed by placing a copper sheet in close proximity to a levitated permanent magnet. Unfortunately, in rotating systems such dampers cause high rotational loss, as the inherent azimuthal magnetic field of the rotating magnet induces eddy currents that develop forces to oppose the rotation. This and other existing methods to increase damping cause much higher rotational loss, which reduces or negates the primary benefit of the superconducting bearing. Another technique is to combine an active magnetic bearing with the superconducting bearing to increase the damping as needed. This technique also increases the losses in the bearing system.

In view of the foregoing, there is a need in the art for apparatuses and methods to increase the damping of a superconducting bearing without sacrificing the low rotational loss. In addition, there is a need for such apparatuses and methods to operate with flywheel energy storage systems. There is further a need for such systems and apparatuses in space applications. These and other needs are met by the present disclosure as detailed hereafter.

SUMMARY

Methods and apparatuses to provide improved auxiliary damping for superconducting bearings in superconducting levitation systems are disclosed. In a superconducting bearing, a cryostat housing the superconductors is connected to a ground state with a combination of a damping strip of material, a set of linkage arms to provide vertical support, and spring washers to provide stiffness. Alternately, the superconducting bearing may be supported by a cryostat connected to a ground state by posts constructed from rolled-up mesh of fibers, with the damping and stiffness controlled by the fiber composition, size, and mesh geometry.

In one embodiment, an apparatus for damping a superconducting levitation system includes a superconducting element generating a magnetic field having a first resonance frequency between the superconducting element and a ground state, a magnet supported by the magnetic field generated by the superconducting element relative to a ground state having a second resonance frequency between the magnet and the superconducting element, one or more supports for vertically supporting the superconducting element relative to the ground state, and a damping strip spanning a gap between the superconducting element and the ground state for providing damped motion such that the first resonance frequency is lower than the second resonance frequency. Typically, the damped motion is provided in a direction substantially perpendicular to support of the magnet by the magnetic field.

The superconducting element may comprise a superconducting stator, the magnet comprises a permanent magnet rotor, and the damped motion of the superconducting stator is substantially radial to the permanent magnet rotor. In further embodiments, one or more springs are included to laterally stabilize the superconducting element along the damped motion of the damping strip. The damping strip may be a material resilient at low temperatures, such as silicon rubber. In addition, a cryostat thermally coupled to the superconducting element may be used to maintain superconductivity of the superconducting element.

In a similar manner, one method embodiment for damping a superconducting levitation system, comprises the steps of generating a magnetic field with a superconducting element having a first resonance frequency between the superconducting element and a ground state, supporting a magnet with the magnetic field generated by the superconducting element relative to a ground state having a second resonance frequency between the magnet and the superconducting element, supporting the superconducting element vertically relative to the ground state with one or more supports, and damping motion between the superconducting element and the ground state with a damping strip spanning a gap such that the first resonance frequency is lower than the second resonance frequency. This method may be further modified consistent with the apparatus embodiments described herein.

In another embodiment, an apparatus for damping a superconducting levitation system includes a superconducting element generating a magnetic field having a first resonance frequency between the superconducting element and a ground state, a magnet supported by the magnetic field generated by the superconducting element relative to a ground state having a second resonance frequency between the magnet and the superconducting element, and one or more mesh fiber supports, each comprising a mesh fiber column fixed at a first end to the superconducting element and fixed at a second end to the ground state for vertically supporting the superconducting element relative to the ground state and for providing damped motion such that the first resonance frequency is lower than the second resonance frequency. Typically, the superconducting element may include a superconducting stator and the magnet may comprise a permanent magnet rotor, such that the damped motion of the superconducting stator is substantially radial to the permanent magnet rotor.

In some embodiments, at least one of the one or more mesh fiber columns comprises a spirally wound mesh fiber material strip. In addition, at least one of the one or more mesh fiber columns may comprise a plurality of substantially concentric mesh fiber cylindrical columns.

A cryostat thermally coupled to the superconducting element may be employed to maintain superconductivity of the superconducting element. The cryostat may comprise a cold head thermally coupled to the superconducting element through a flexible thermal conductor.

In a similar manner, a method for damping a superconducting levitation system, includes the steps of generating a magnetic field with a superconducting element having a first resonance frequency between the superconducting element and a ground state, supporting a magnet with the magnetic field generated by the superconducting element relative to a ground state having a second resonance frequency between the magnet and the superconducting element, supporting the superconducting element vertically relative to the ground state with one or more mesh fiber supports, each comprising a mesh fiber column fixed at a first end to the superconducting element and fixed at a second end to the ground state, and damping motion between the superconducting element and the ground state with the one or more mesh fiber supports such that the first resonance frequency is lower than the second resonance frequency. This method may be further modified consistent with the apparatus embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Figure 1A:
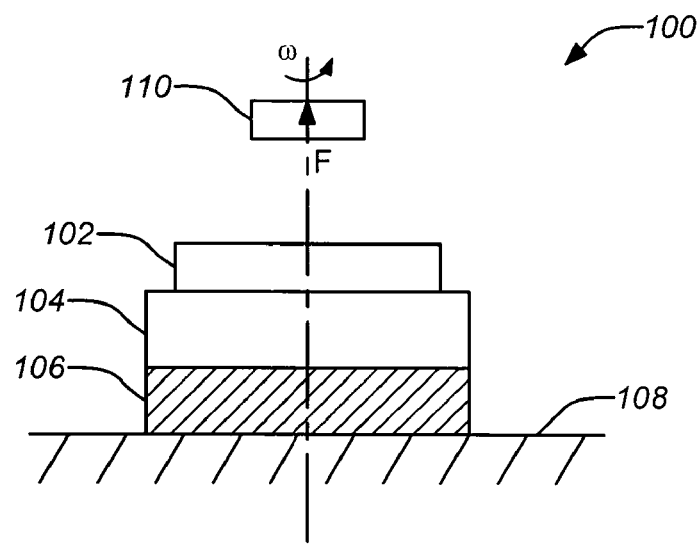
FIGS. 1A & 1B illustrate conventional permanent magnet high-temperature superconducting levitation systems.
Figure 1B:
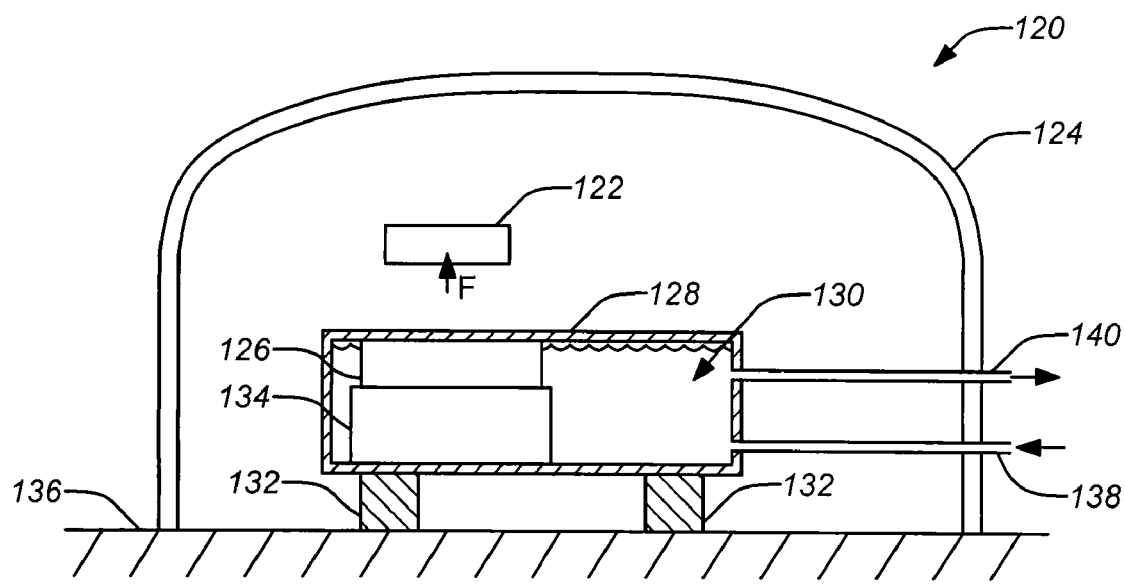

Apparatuses and methods for improved damping in high-temperature superconducting levitation systems are disclosed. A superconducting element (e.g., a stator) generating a magnetic field and a magnet (e.g., a rotor) supported by the magnetic field are provided such that the superconducting element is supported relative to a ground state with damped motion substantially perpendicular to the support of the magnetic field on the magnet. Applying this, a cryostat housing the superconducting bearing may be coupled to the ground state with high damping but low radial stiffness, such that its resonant frequency is less than that of the superconducting bearing. The damping of the cryostat may be substantially transferred to the levitated magnetic rotor, thus, providing damping without affecting the rotational loss, as can be derived applying coupled harmonic oscillator theory in rotor dynamics. Thus, damping can be provided to a levitated object, without substantially affecting the rotational loss. Damping of the superconducting levitation system is achieved with either a novel absorption strip or one or more novel mesh material columns disposed between the superconducting element and a ground state.

As previously mentioned, embodiments of the disclosure can provide damping to a levitated object, and in particular, to a levitated rotating object without affecting the rotational loss. For the case of the superconducting bearing, a typical embodiment of the disclosure can include a permanent magnet (PM) rotor and a superconductor (SC) stator. In some embodiments, the rotor may rotate in a vacuum. Although embodiments of the disclosure are described with regard to a superconducting bearing and magnetic rotor, it should be noted that embodiments of the disclosure may be applied in general to any levitation system employing a superconductor as will be understood by those skilled in the art. Typically, the permanent magnet rotor may be disposed above the superconductor stator, but other configurations are also possible as will be understood by those skilled in the art. Further, the permanent magnet may be coupled to other components to form the complete rotor that is levitated under the influence of the superconductor. The superconductor may include multiple elements, such as an array of bulk high-temperature superconductors (HTSs). In addition, the magnetic rotor may comprise a complete rotating assembly in a flywheel assembly. To simplify the presentation, the magnetic rotor is shown herein as a single element throughout the description although actual implementations may comprise different shapes, additional parts and configurations depending upon the particular application as will be understood by those skilled in the art.

Furthermore, depending upon the temperature requirements, the superconductor is typically coupled to a cooling mechanism, a cryostat. In one embodiment, the cryostat comprises a cryogenic fluid. The superconductor may reside within the cryostat, bathed in the cryogenic fluid. Alternately, the superconductor may be disposed on a wall outside the cryostat. In this case, the hoses that allow cryogenic fluid to flow in and out of the cryostat are sufficiently flexible to provide minimal stiffness to the cryostat in the direction of the necessary damped motion. Many suitable flexible cryogenic fluid hoses are commercially available as known by those skilled in the art. In another embodiment, the superconductor may be disposed on a plate that is coupled by a thermal conductor to a cold head of a cryocooler. In this case, the thermal conductor, e.g., a braid of flexible, small-diameter, copper wire, can similarly provide minimal stiffness to the cryostat in the direction of the damped motion.

In general, the cryostat and supporting structure must exhibit low stiffness in the direction of the necessary damped motion. This can be achieved in different ways. In one example superconducting bearing, the cryostat housing the superconductors is connected to ground with a combination of a damping strip of material, a set of linkage arms to provide vertical support, and spring washers to provide stiffness. In another example, a cold head of a cryocooler may be thermally coupled to the superconducting bearing (through a flexible coupler) while the superconducting bearing is supported on one or more mesh material columns. The columns of mesh material (e.g., woven material) support the bearing vertically while providing damping in a lateral direction.

In many applications it may be desirable for the cryostat to be thermally isolated from the damping mechanism. For example, if the cryostat includes a cryogenic fluid, its radial wall could comprise a double wall, providing by a vacuum layer, such as that used to insulate some beverage containers. Embodiments of the disclosure may be used in many different applications and hardware configurations. While the description herein may be focused on a superconductor bearing, embodiments of the disclosure are applicable to almost any levitation system as will be understood by those skilled in the art.

The analysis describing how the damping between the non-rotating cryostat and the ground is transferred to damping the radial displacement of the rotor is derived from the phenomena of coupled harmonic oscillators and is well known in the study of foundations in rotor dynamics. Damping may be best transferred when the natural frequency of vibration of the cryostat is less that that of the rotor. Analytical modeling is described in the final section of the disclosure herein.

Figure 2:
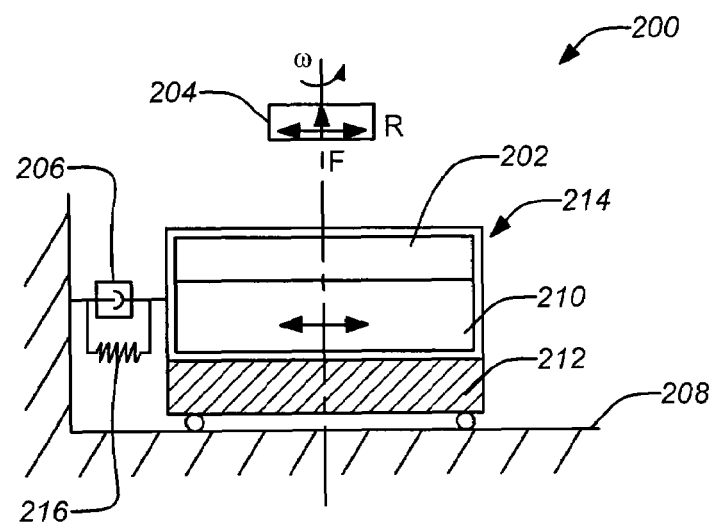
FIG. 2 is a schematic diagram of an exemplary embodiment of the disclosure using a permanent magnet high-temperature superconducting levitation system with damping.

FIG. 2 is a schematic diagram of an exemplary embodiment of the disclosure using a permanent magnet high-temperature superconducting levitation system 200 with damping. The generalized system 200 includes a superconducting element 202 (such as a stator 214 in a rotating system) that produces a magnetic field that levitates a magnet 204 (such as a rotor in a rotating system). The magnet 204 and superconducting element 202 are magnetically connected such that an equilibrium position exists between the two and there are magnetic restoring forces, R, that tend to keep the magnet 204 at the equilibrium position. Resonant frequencies are associated with small vibrations of the magnet 204 about this equilibrium. There is one resonant frequency for vibrations along the principal axis of the system and a separate radial resonant frequency for vibrations perpendicular to this axis. The superconducting element 202 is supported in a manner that allows it to translate in a direction substantially perpendicular to the supporting force F provided to the magnet 204 relative to a ground state 208. Support to the superconducting element 202 may be provided by any structure so long as a first resonance frequency between the superconducting element and ground is lower than a second resonance between the superconducting element and the magnet. For example, the structure may be vertical linkage support and a damping strip for lateral (radial) damping or one or more mesh columns which provide both vertical support and lateral damping. Either structure can be designed to be tuned to with proper resonant frequency relationship by one skilled in the art. These forces are applicable to all embodiments of the disclosure described herein. There is a resonant frequency associated with the restoring force that governs small vibrations of the superconducting element relative to ground.

It should be noted that the magnetic field itself varies in many directions over the surface of the magnet and the superconductor. Thus, providing damped motion substantially perpendicular to support of the magnet by the magnetic field refers to the net direction of the magnetic force on the magnet. In general, embodiments of the disclosure can operate provide damping in two orthogonal directions, but not in a third. The third direction is typically in the direction of net magnetic force. In addition, the third direction is typically axial (e.g., in the case of a rotating bearing), so that damping occurs in both radial directions. However, these are not requirements. Those skilled in the art will appreciate that embodiments of the disclosure may also be implemented to provide damping in the axial direction and one radial direction.

In addition, a damping means 206 is provided to damp motion in that direction. Damping from the damping means 206 is coupled to the levitated magnet 204. A spring 216 is also typically modeled with a damping means 206 to keep the moving mass stabilized at an equilibrium point as understood by those skilled in the art. The damping is substantially transferred to the levitated magnet 204 when the resonant frequency of the superconducting element relative to ground is less than the radial resonant frequency of the magnet relative to the superconductor. In most practical applications, the superconducting element 202 will require cooling to maintain superconductivity. Thus, a cooling means 210 must be thermally coupled to the superconducting element 202. The superconducting element 202 and cooling means 210 together should be thermally isolated from the ground state with thermal insulation 212. This foundational principle can be applied to various levitation systems in many exemplary embodiments of the disclosure. The stator 214 can be considered to include the superconducting element 202, the cooling means 210 and the thermal insulation 212, essentially all the elements (other than the levitated magnet 204) that are isolated from the ground state 208.

With embodiments of the present disclosure, some of the interaction between the magnet and superconductor element is similar to conventional superconducting levitation systems. The superconductor element may be mounted on a platform of some type, either inside a cryogenic bath of attached to some conduction cooled device. Some damping is caused by the magnetic interaction between the levitated magnet and the superconductor element in a manner analogous to the operating principle of known eddy-current dampers. However, in this case the energy loss which causes the damping is due to the magnetic hysteresis in the superconductor element (as opposed to eddy currents). When the magnet oscillates (in either the radial or axial direction), the magnetic field seen by the superconductor element exhibits an AC component, and this AC induces a hysteretic loss. In terms of stiffness, the magnetic coupling is such that the bearing resonance frequency is typically lower than that of other bearings for rotating systems. (There is an advantage here in that one may go through the bearing critical at a low frequency, where the centrifugal forces are modest.)

Embodiments of the present disclosure increase the damping between the superconductor element holder and the ground and also reduce the resonant frequency in the radial direction to be less than that between the superconductor element and the magnet, so that the damping is efficiently coupled to the levitated magnet for this mode of vibration. Stiffness can be varied depending on the size of the system as necessary to achieve the required resonance frequencies. Applying this principle, embodiments of the disclosure may provide enhanced damping in either the radial or axial direction (but not both together).

However, in rotating systems it is almost always the radial direction that causes difficulties (because of the centrifugal force). Accordingly, examples described herein are described to damp in that direction (although the embodiments of the disclosure are not limited as such). In addition, the examples described herein employ a thrust bearing configuration to provide support in the axial direction, so stiffness between the superconductor element holder and ground in that direction must be high.

2. Damped Superconducting Levitation System Using Absorption Strip

Figure 3A:
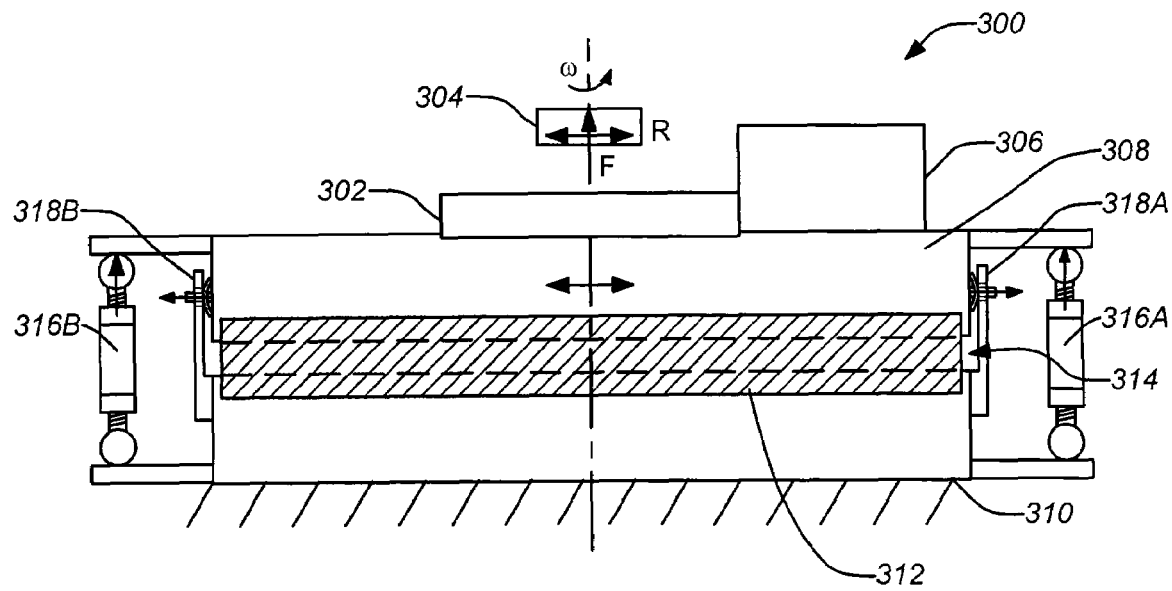
FIG. 3A is a schematic diagram of an exemplary embodiment utilizing linkage supports and a damping strip.

FIG. 3A is a schematic diagram of an exemplary embodiment utilizing linkage supports and a damping strip. The levitation system 300 comprises superconducting element 302 that produces a magnetic field that levitates a magnet 304. The magnet 304 and superconducting element 302 are magnetically coupled and interact as the magnet 204 and superconducting element 202 of FIG. 2. The superconducting element 302 is coupled to a cooling means 306 for maintaining the superconducting element at the proper temperature. The cooling means 306 may be a cryochamber that encloses the superconducting element 302 and magnet 304 (and any other system apparatus), a cryocooler remotely located and thermally coupled to the system, or any other suitable cooling system know in the art.

The superconducting element 302 is affixed to a supporting structure 308 such that the components are considered together (as well as the magnet 302 and any attached cooling means 306) as they are isolated from a ground state 310. Damping of the system 300 is implemented by a damping strip 312 (or absorption strip) of material spanning a gap 314 between the superconducting element 304 (specifically, the supporting structure 308) and the ground state 310. One side of the strip 312 is affixed to the side with the superconducting element 304, while other side is affixed to the ground state 310. The strip 312 may be affixed by bonding or clamping or any other suitable method. The damping strip is made of a material, such as silicone rubber, that has good absorption properties at low temperature. The strip 312 provides lateral (radial) damping, but does not support the weight of the superconducting element 304, supporting structure 308, magnet 304 and any attached cooling means 306.

Vertical support of the weight of the components is carried by linkages 316A, 316B which are designed to allow small lateral movements (that are damped by the strip 312). This can be accomplished by using spherical end links for each linkage 316A, 316B. In addition, height adjustment of the linkages 316A, 316 can be accomplished using a turnbuckle with locknuts as shown. Finally, the components may be stabilized laterally (if the strip 312 is insufficient for this). Opposing springs 318A, 318B may be used to stabilize the superconducting element 304 and other components. For example, one or more Belleville springs may be biased between a screw head and a flange attached to the ground state 310 as shown. Any other suitable stabilizing mechanism may also be used. The lateral stabilizing forces operate in conjunction with the lateral damping from the strip 312.

Figure 3B:
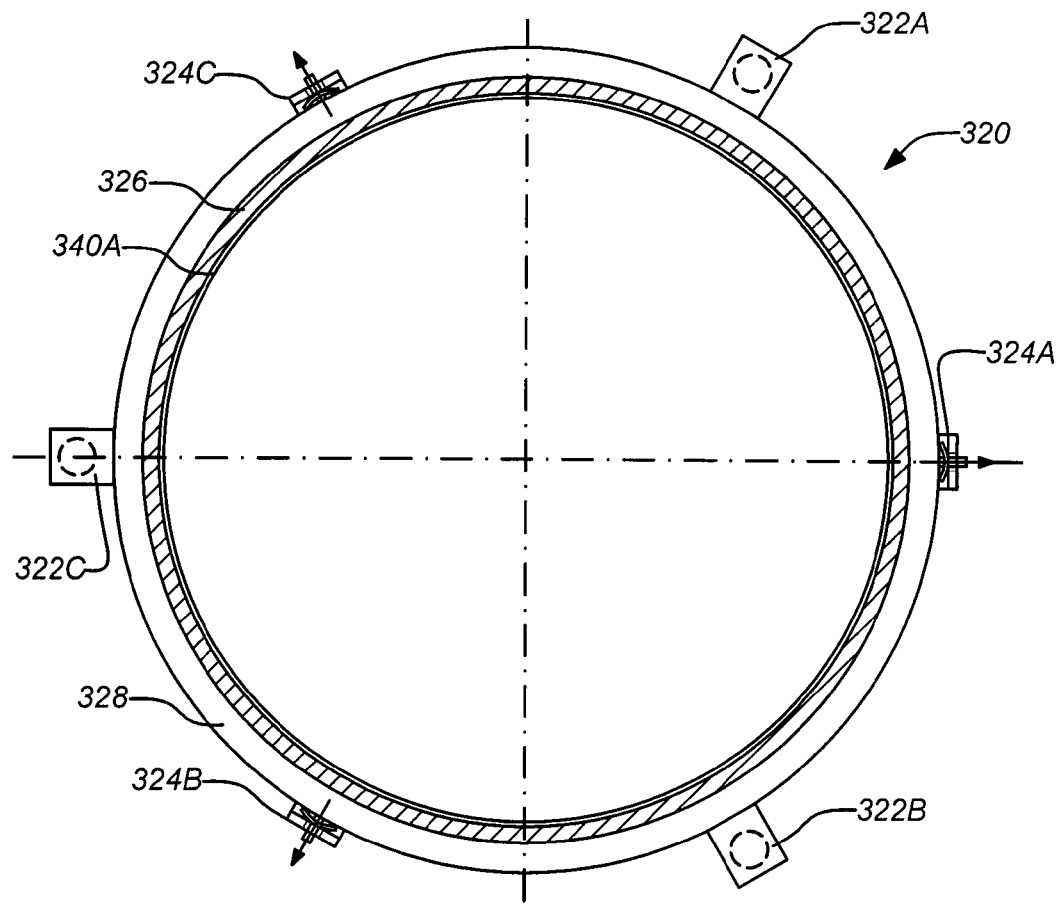
FIGS. 3B & 3C illustrate a top and side view of an exemplary embodiment utilizing linkage supports and a damping strip in a cylindrical configuration.
Figure 3C:
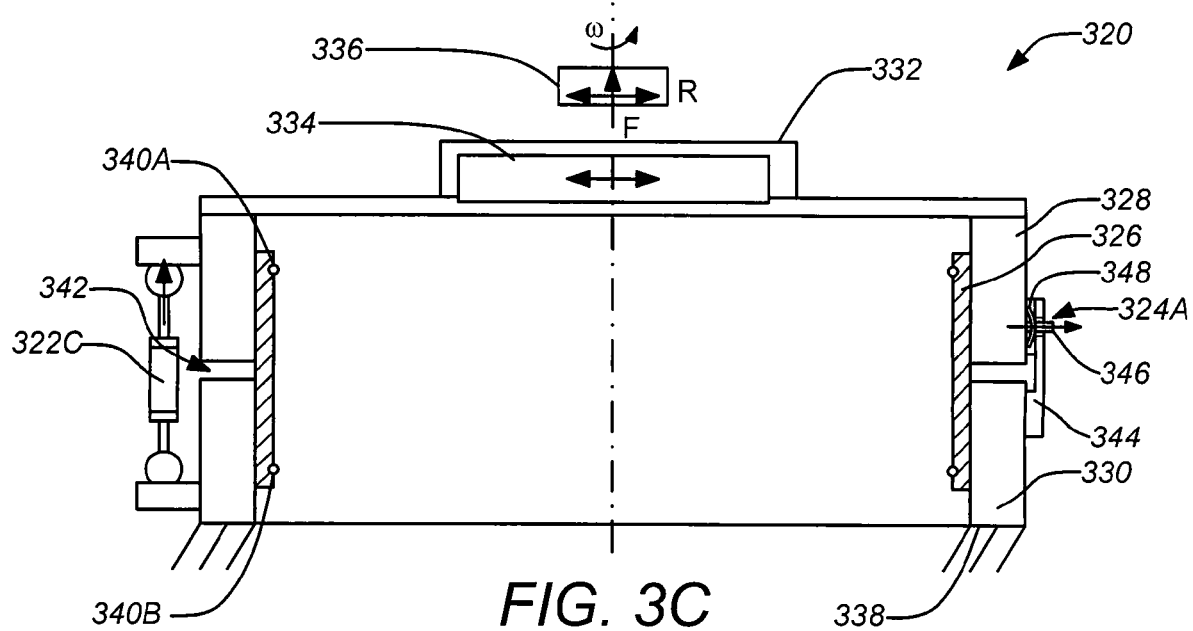

FIGS. 3B & 3C illustrate a top and side view of an exemplary embodiment utilizing linkage supports 322A, 322B, 322C and a damping strip 326 in a cylindrical configuration. The exemplary levitation system 320 is constructed from two cylindrical sections, an upper cylinder 328 and a lower cylinder 330. The upper cylinder 328 and lower cylinder 330 may be constructed from a fiber composite with good properties at cryogenic temperatures, such as G-10, a thermosetting industrial laminate comprising a continuous filament glass cloth material with an epoxy resin binder. The upper cylinder 328 is attached to a cryochamber 332 which houses the superconducting element 334. Typically, the magnet 336 operates at the ambient temperature. (These components are magnetically coupled and interact as the magnet 204 and superconducting element 202 of FIG. 2.) Alternately, the system 320 may use a cryocooler remotely located and thermally coupled to the system 320, or any other suitable cooling system know in the art. The lower cylinder 330 is attached to a ground state 338.

The upper cylinder 328 is coupled to the lower cylinder 330 by linkages 322A, 322B, 322C, opposing springs assemblies 324A, 324B, 324C, and the damping strip 326. The damping strip 326 is disposed on the inside of the upper and lower cylinders 328, 330, spanning the horizontal gap 342 between them. Thus, the damping strip 326 effectively spans a gap between the superconducting element 334 (attached to the upper cylinder 328) and the ground state 338 (attached to the lower cylinder 330). Alternately, the damping strip 326 may also be disposed on the outside surfaces clamped to the upper cylinder 328 and lower cylinder 330, for example.

The damping strip 326 may be held in place by two wire loops 340A, 340B that put the strip 326 in compression, a first loop 340A on the upper cylinder 328, and a second loop 340B on the lower cylinder 330. The diameter of each wire loop 340A, 340B is slightly larger than the inside diameter of the strip 326 when it is placed on the inner surface of the upper and lower cylinders 328, 330. The wires 340A, 340B are far enough from the horizontal gap 342 that the strip 326 is minimally compressed around this joint. As before, the strip 326 is made of a material, such as silicone rubber, that has good absorption properties at low temperature. Alternately, the damping strip 326 may be bonded or attached to the upper and lower cylinders 328, 330 through any means known in the art. The function of the strip 326 is to damp out any lateral motion between the upper and lower cylinders 328, 330.

The system 320 uses three linkages 322A, 322B, 322C, spaced 120 degrees apart as viewed from the top in FIG. 3B. These linkages 322A, 322B, 322C vertically support the weight of the upper cylinder 328 (including the cryochamber 332 and other elements) and any downward force that the bearing puts on it. The linkages 322A, 322B, 322C comprise rods with rounded ends that are disposed in indentations in aluminum holders attached to the upper and lower cylinders 328, 330, respectively. This configuration allows the assembly to move freely in any horizontal direction, but not vertically. Thus, the upper and lower cylinders 328, 330 cannot make contact with each other. Alternately, the linkages 322A, 322B, 322C may be constructed as the linkages 316A, 316B of FIG. 3A.

The system 320 also employs three opposing spring assemblies 324A, 324B, 324C, spaced 120 degrees apart as shown in FIG. 3B. These assemblies each comprise a tab 344 that is connected to the lower cylinder 330, and a pin 346 that is coupled to the upper cylinder 328. The pin 346 passes through a slot in the tab 344. The pin 346 passes through the center of one or more spring washers 348 (e.g., Belleville washers) that are located between the tab 344 and the upper cylinder 328.

The function of the spring washers 348 is to provide a centering force to keep the upper piece directly above the lower piece and to provide a mechanical stiffness in the horizontal direction to the upper cylinder 328. Thus, the vector sum of the forces of all the opposing spring assemblies 324A, 324B, 324C must equal zero.

In operation, the cryochamber 332 and entire system 320 operate in vacuum. In addition, the cryochamber 332 and supporting structure may be covered with one or more layers of radiation insulation, such as aluminized mylar, which has a low emissivity.

The damping mechanism shown in FIGS. 3A, 3B and 3C can be used successfully to eliminate the sub-synchronous whirl from a flywheel levitated with a high-temperature superconducting bearing. For example, the system 320 may operate with a radial stiffness of approximately 300 N/mm and the damping coefficient of about 1000 kg/s. The cryochamber 332 housing the superconductor elements 334 may use liquid nitrogen flowing through it.

The use of multiple sets of radial springs offers the possibility of employing a stiffness in one lateral direction that is different than the stiffness in the other lateral direction. This can be used to increase the stability of the levitation system. For example, if four sets of opposing spring assemblies were used, spaced 90 degrees apart, one pair of opposing spring assemblies (spaced 180 degrees apart from each other) could employ stiffer springs than the other pair.

3. Damped Superconducting Levitation System Using Damping Posts

Figure 4A:
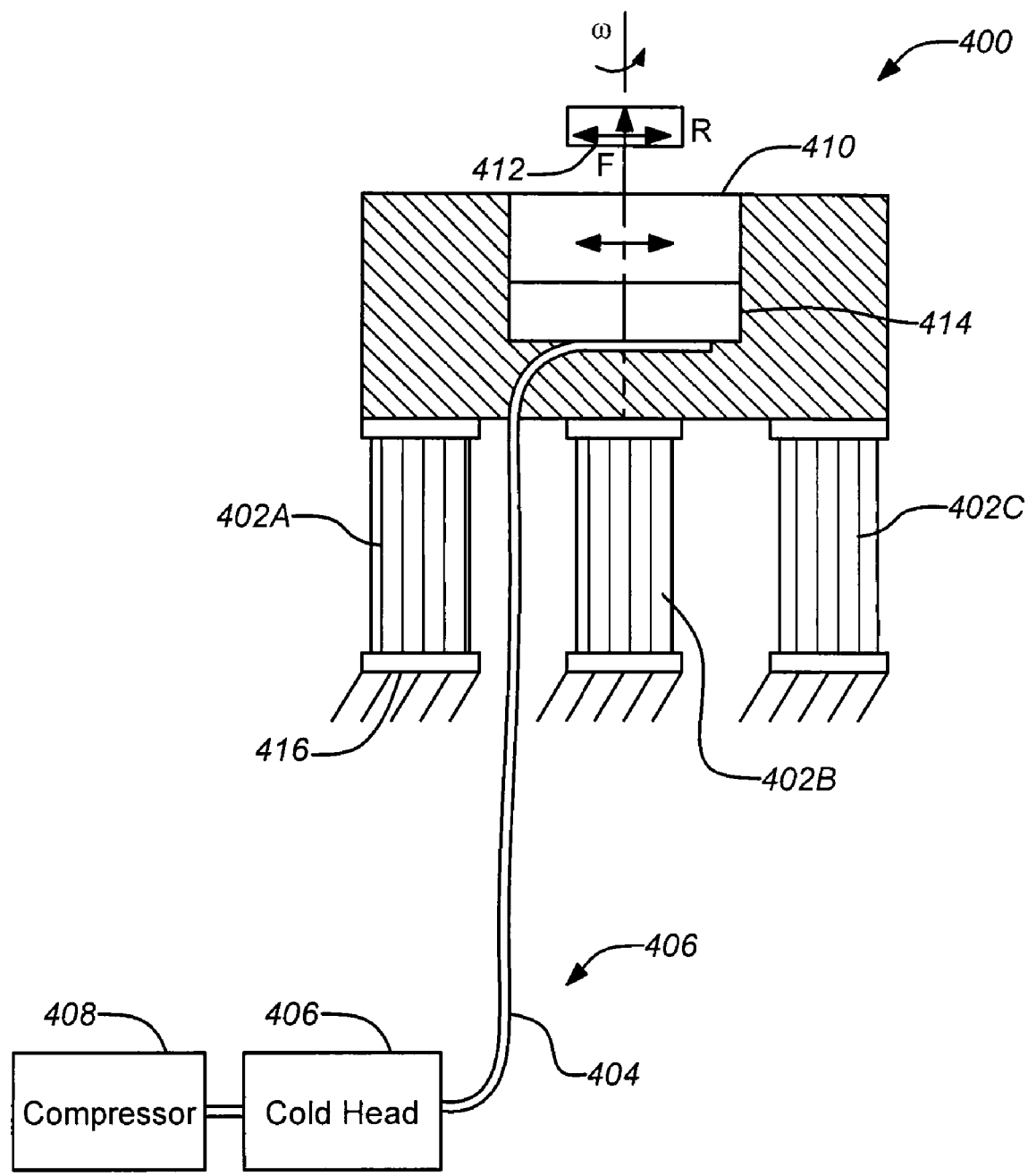
FIG. 4A is a schematic diagram of another exemplary embodiment having woven fiber column supports.

FIG. 4A is a schematic diagram of another exemplary embodiment having woven fiber column supports 402A, 402B, 402C. In this levitation system 400, the superconductor element may be conduction cooled by a flexible thermal conductor 404 to the cold head 406 of a cryocooler 406 (that is cooled using compressor 408). The entire high temperature superconductor array, including a superconducting element 410 and a magnet 412, a supporting copper plate 414 (coupled the thermal conductor 404), are mechanically connected to the ground state 416 by three mesh fiber supports 402A, 402B, 402C. The three mesh fiber supports 402A, 402B, 402C may be constructed from axial and circumferential fibers woven together. (The superconducting element 410 and a magnet 412 are magnetically coupled and interact as the magnet 204 and superconducting element 202 of FIG. 2.)

The axial fibers of the three mesh fiber supports 402A, 402B, 402C provide support in either tension or compression between the superconducting element 410 and the ground state 416. Due to the high modulus of the axial fibers, no compression or tension movement is allowed. In addition, the bending stiffness of the fibers of the three mesh fiber supports 402A, 402B, 402C returns the movable element (including the superconducting element 410) to a neutral position when no lateral force is applied, but allows some lateral motion.

The mesh fibers provide a number of functions. Friction between the circumferential and axial fibers absorbs energy imparted by the lateral motion, damping out the forces applied. The circumferential fibers increase the compressive strength of the axial fibers, preventing them from buckling. The circumferential fibers add additional stiffness which further assists in returning the cylindrical support to a neutral position.

Performance of the mesh fiber supports can be controlled by any combination of, but not limited to, the following conditions; aspect ratio of the external or internal dimensions of the mesh, axial length and internal or external dimensions of the mesh fiber support may be adjusted, spacing between fibers or groups of fibers in either lateral or perpendicular directions can be adjusted, additional fibers in specific directions that are not part of the basic mesh configuration described previously may be applied to adjust the properties of the mesh fiber support as well as the thickness of the individual fibers or groups of fibers. A further damper performance control can be realized by altering the general shape of the mesh fiber support cylinder. For example, a circular cylinder will damp in all lateral directions equally, while an oval cylinder will damp motion differently from different directions related to the width and thickness of the oval profile. Finally, tension applied to the mesh layers during wrapping, or by varying the compression between layers.

Figure 4B:
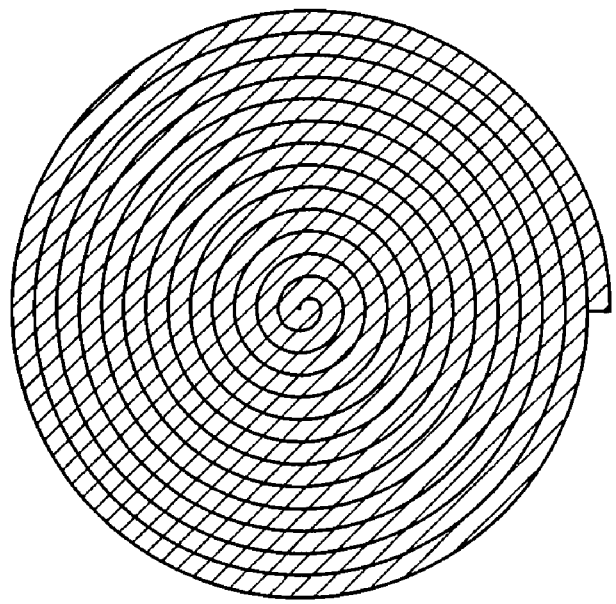
FIGS. 4B & 4C illustrate spiral wound and concentric cylindical woven fiber column supports.
Figure 4C:
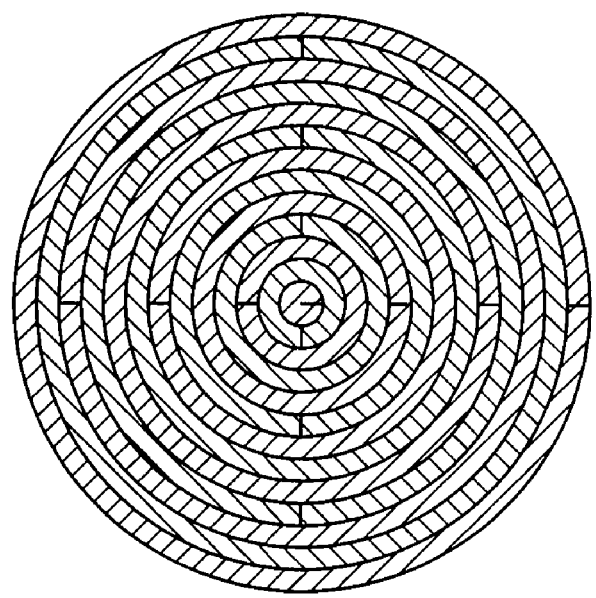

FIGS. 4B and 4C illustrate spiral wound and concentric cylindical woven fiber column supports. Each damper comprises a strip of mesh material spirally rolled around itself to form a semi-rigid cylinder as shown in FIG. 4B. Alternately, the mesh material may be arranged in nesting concentric individual cylinders as shown in FIG. 4C. The individual cylinders may be closed by stitching, gluing or brazing the edges together or using any other known technique for binding material edges appropriate for the selected mesh material. The material may comprise a woven cloth made of fibers arranged such that one row of fibers, or groups of fibers, are oriented in the axial direction and the other woven perpendicular to the first. The axial ends of the cylinder are attached to structural members in such a way that one end of the cylinder is fixed to one member, while the other end is attached to a movable member whose lateral motion is to be damped. These ends may be attached with adhesives (e.g., epoxy), slot attachment, weaving, silver solder or brazing or using any other known technique for attachment appropriate for the selected mesh material. It should also be noted that although the example column supports of FIGS. 4B and 4C are shown with no space between layers of the spiral and concentric material layers, space between the layers may or may not be exist; spacing between the layers is an adjustable parameter to modify the performance in the column design as will be understood by those skilled in the art.

Composition of the woven fiber can comprise a combination of natural or man-made materials, such as metal, glass, or plant fibers. Fibers may or may not be attached to each other in parallel or perpendicular directions by mechanical crimp, adhesive, or other attachment methods. For example, the woven fiber material may be made from aluminum or stainless steel woven screen material used in the woven mesh.

Figure 4D:
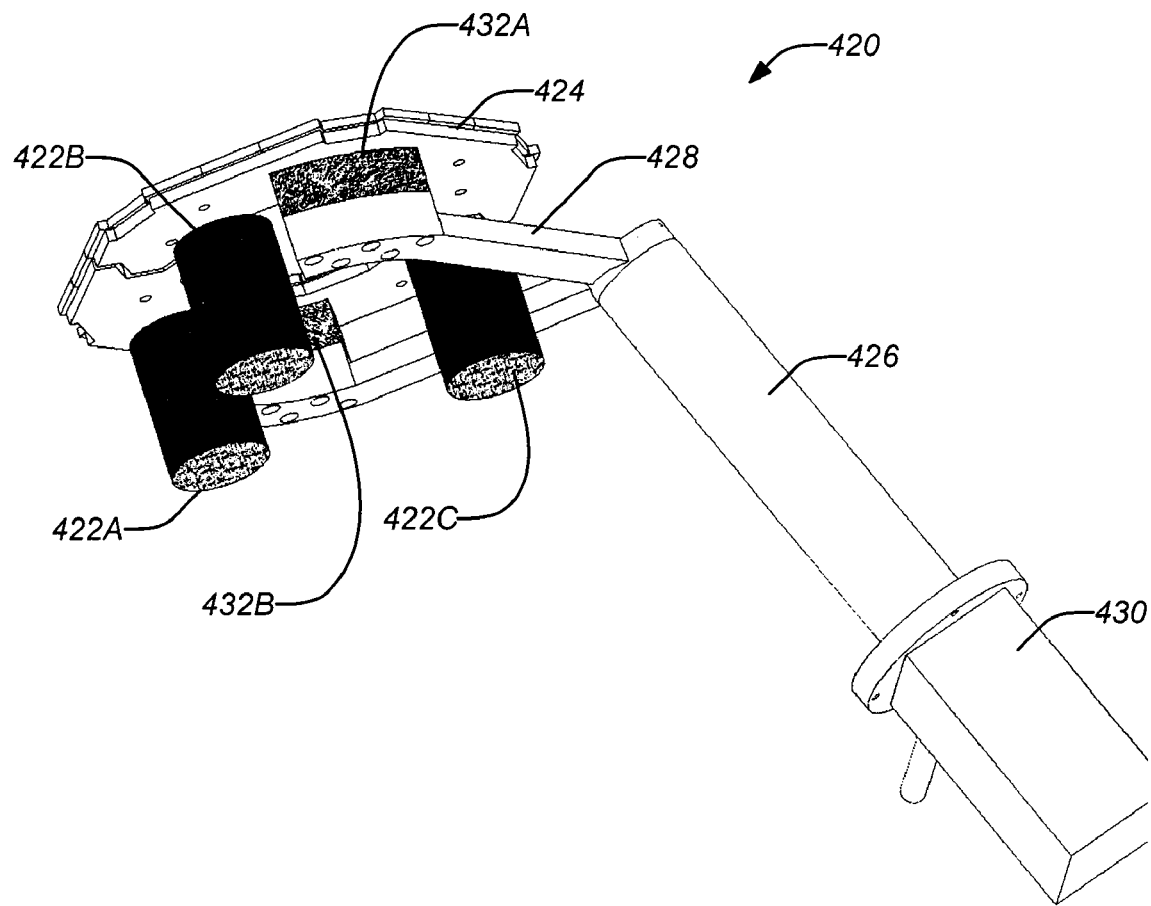
FIG. 4D illustrates another exemplary embodiment using woven fiber column supports.

FIG. 4D illustrates another exemplary embodiment using woven fiber column supports. The system 420 is supported and damped as previously described using three mesh fiber supports 422A, 422B, 422C which are fixed at their upper ends to a copper plate 424. The lower ends of the three mesh fiber supports 422A, 422B, 422C are fixed to a ground state. Copper plate 424 is used to support the superconducting element and magnet (not shown) which operate as previously described. The superconducting element is maintained at its operating temperature by the cold head 426 of the cryocooler 430 which is coupled to the copper plate 424 through a flexible copper element 428. In turn, the flexible copper element 428 is thermally coupled to the copper plate 424 through a pair of copper blocks 432A, 432B.

4. Methods of Damping Superconducting Levitation Systems

The apparatuses described in the previous sections also involve novel methods for damping superconducting levitation systems. In one method damping in a superconducting levitation system is performed using a damping strip. In another method, damping in a superconducting levitation system is performed using one or more mesh fiber supports.

Figure 5A:
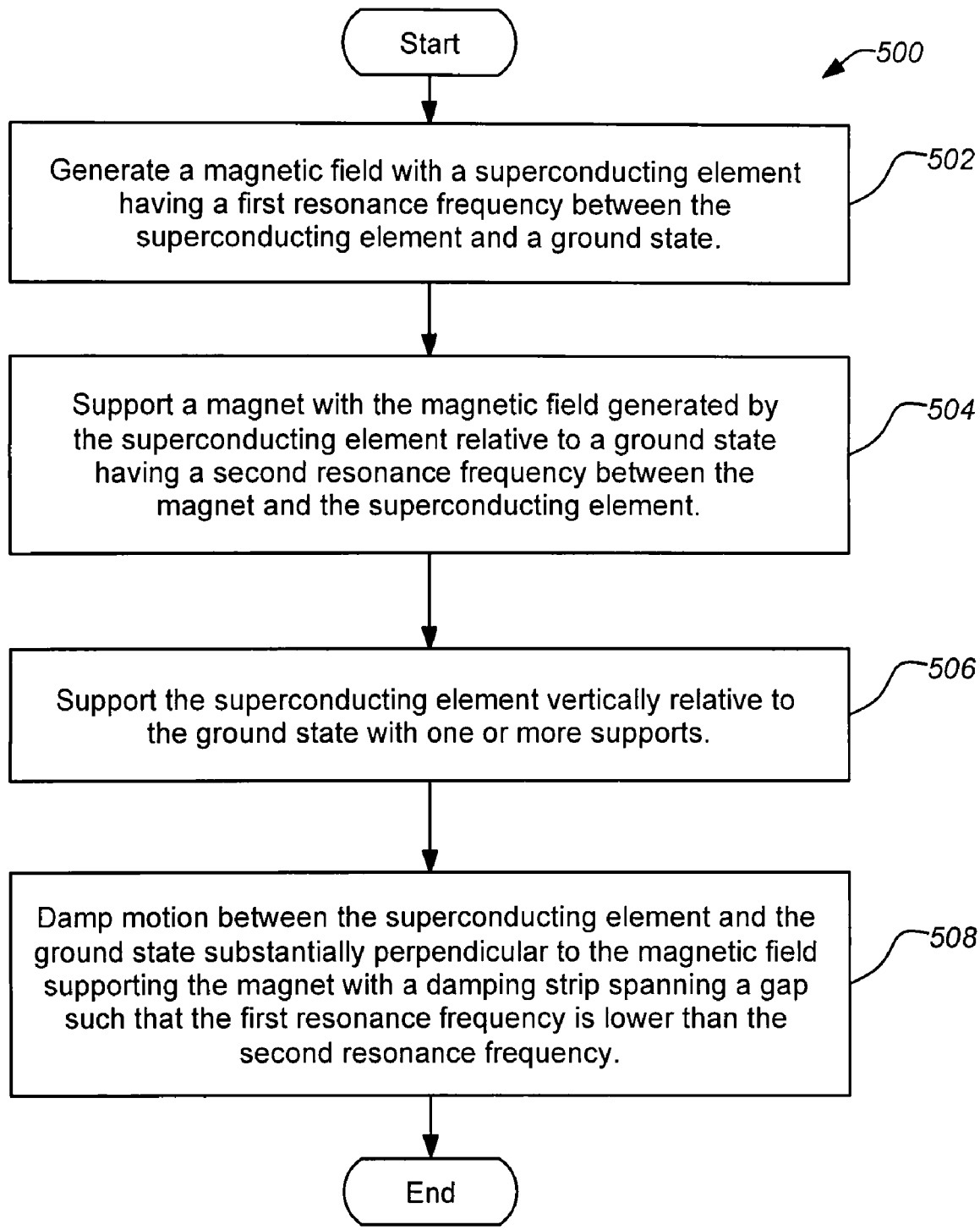
FIG. 5A is a flowchart of an exemplary method of damping a levitation system using one or more vertical supports and a damping strip.

FIG. 5A is a flowchart of an exemplary method 500 of establishing damping in a superconducting levitation system using a damping strip. The method 500 begins with an operation 502 of generating a magnetic field with a superconducting element having a first resonance frequency between the superconducting element and a ground state. Next in operation 504, a magnet is supported with the magnetic field generated by the superconducting element relative to a ground state having a second resonance frequency between the magnet and the superconducting element. In operation 506, the superconducting element is supported vertically relative to the ground state with one or more supports. Finally in operation 508, motion between the superconducting element and the ground state is damped substantially perpendicular to the magnetic field supporting the magnet with a damping strip spanning a gap such that the first resonance frequency is lower than the second resonance frequency. The method 500 may be further modified consistent with the apparatuses and other methods described herein.

Figure 5B:
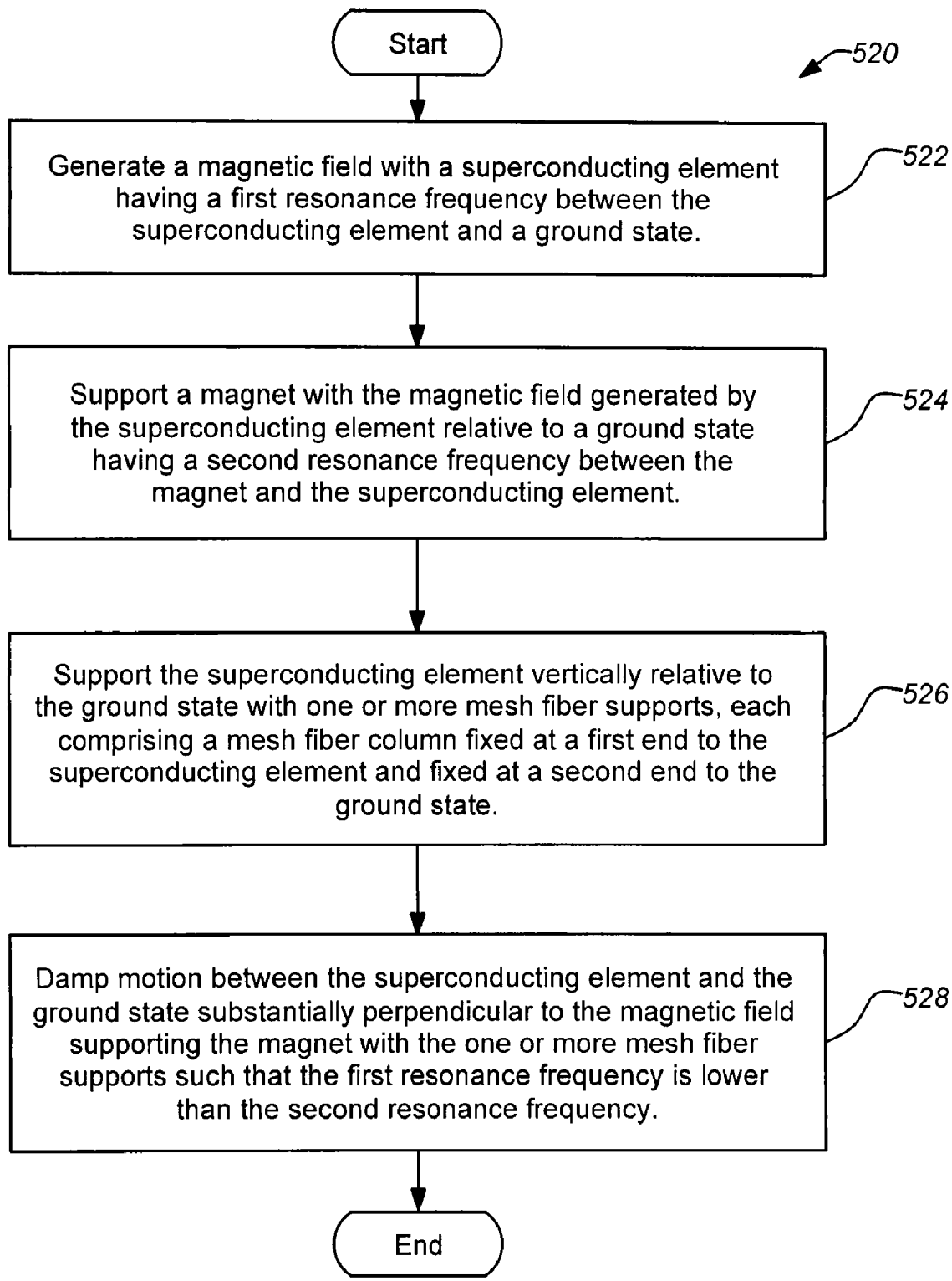
FIG. 5B is a flowchart of an exemplary method of damping a levitation system using woven fiber column supports.

FIG. 5B is a flowchart of an exemplary method 520 of establishing damping in a superconducting levitation system using one or more mesh fiber supports. This method 520 begins with an operation 522 of generating a magnetic field with a superconducting element having a first resonance frequency between the superconducting element and a ground state. Next in operation 524, a magnet is supported with the magnetic field generated by the superconducting element relative to a ground state having a second resonance frequency between the magnet and the superconducting element. In this method 520, the superconducting element is supported vertically relative to the ground state with one or more mesh fiber supports, each comprising a mesh fiber column fixed at a first end to the superconducting element and fixed at a second end to the ground state in operation 526. Finally in operation 528, motion between the superconducting element and the ground state is damped substantially perpendicular to the magnetic field supporting the magnet with the one or more mesh fiber supports such that the first resonance frequency is lower than the second resonance frequency. The method 520 may be further modified consistent with the apparatuses and other methods described herein.

5. Analysis of Damping in a Superconducting Levitation System

The applicable analytical basis for embodiments of the disclosure can be begin with an analytical model of a single damped harmonic oscillator. The single mass, m, is disposed on a spring with constant, k and damping, c. The displacement of the mass is x measured parallel to the spring force. The motion is described by the following equation.

$$m\ddot{x}+c\dot{x}+kx=F(t)=F_0 e^{i\omega t}$$

Where F is the force at time t. We choose t=0 so that the constant $F_0$ is real. The solution is of the form $x=Ae^{pt}$, where A and p are complex.

For free vibrations, $F_0 0$ $(p^2 Am+pAc+kA)e^{pt}=0$ and $\omega_0=\sqrt{k/m}$ is the resonant frequency.

$mp^2+cp+k=0$ so $p = \dfrac{-c \pm \sqrt{c^2 - 4km}}{2m}$

If $c^2 > 4km$, the system is overdamped as follows.

$x = A_1 e^{-\lambda_1 t} + A_2 e^{-\lambda_2 t}$ where $$\lambda_1 = \dfrac{c + \sqrt{c^2 - 4km}}{2m}$$

and $$\lambda_2 = \dfrac{c - \sqrt{c^2 - 4km}}{2m}.$$

If $c^2 < 4km$, the system is underdamped as follows.

$x = A e^{-\lambda t} e^{\pm i\omega_1 t}$ where $$\lambda = \dfrac{c}{2m}$$

and $$\omega = \sqrt{\dfrac{k}{m} - \dfrac{c}{4m^2}}$$

For forced vibrations, $F_0 \neq 0$ $x = A e^{i\omega t}$ and A is complex.

$(-m\omega^2 + ic\omega + k) A e^{i\omega t} = F_0 e^{i\omega t}$

Then $$A = \dfrac{F_0}{[(k - m\omega^2) + i\omega c]} \dfrac{[(k - m\omega^2) - i\omega c]}{[(k - m\omega^2) - i\omega c]} = \dfrac{F_0[(k - m\omega^2) - i\omega c]}{(k - m\omega^2)^2 + \omega^2 c^2}$$

Thus, $$\dfrac{A}{F_0} = |\overline{A}| e^{-i\delta}$$

and $$|\overline{A}|^2 = \dfrac{(k - m\omega^2)^2 + \omega^2 c^2}{[(k - m\omega^2)^2 + \omega^2 c^2]^2}$$

so $$|\overline{A}| = \dfrac{1}{\sqrt{[(k - m\omega^2)^2 + \omega^2 c^2]}}$$

and $$\tan\delta = \dfrac{\omega c}{k - m\omega^2} = \dfrac{\omega c m}{\omega_0^2 - \omega^2} \quad (A1)$$

$$|\overline{A}| = \dfrac{1/m}{\sqrt{[(\omega_0^2 - \omega^2)^2 + \omega^2 c^2/m^2]}} \quad (A2)$$

When $\omega = 0: \delta = 0$, $$|A| = F_0 |\overline{A}| = \dfrac{F_0/m}{\sqrt{\omega_0^2}} = F_0/k$$

When $\omega \to \infty: \delta = \pi$, $|A| \to 0 \to$ $$\dfrac{F_0/m}{\omega^2}$$

When $\omega = \omega_0: \delta = \pi/2$, $$|A| = \dfrac{F_0/m}{\omega c/m} = \dfrac{F_0}{\omega_0 c}$$

Applying initial conditions when $c^2 > 4km$, at $t=0: x=x_0$, $\dot{x}=v_0$, then $A_1 + A_2 = x_0$ and $-\lambda_1 A_1 - \lambda_2 A_2 = v_0$.

Applying initial conditions when $c^2 < 4km$, at $t=0: x=x_0$, $\dot{x}=v_0$, $A = A_0 e^{-i\delta} = A_0 \cos\delta - i A_0 \sin\delta$, $A \cos\delta = x_0$, then $(-\lambda \pm i\omega) A_0 (\cos\delta + i \sin\delta) = -v_0 \pm \omega \cos\delta - \lambda \sin\delta = 0$ and $$\tan\delta = \dfrac{\pm\omega}{\lambda} = \pm\sqrt{\dfrac{4mk}{c^2} - 1}$$

Let $F_0 = em\omega^2$, where e is the center of mass offset in a rotational system. From Equation (A2), $$\left|\dfrac{\overline{A}}{e}\right| = \dfrac{1}{\sqrt{\left[\left(\dfrac{\omega_0^2}{\omega^2} - 1\right)^2 + \left(\dfrac{c}{m\omega}\right)^2\right]}}$$

$\omega \to 0$, $$\left|\frac{A}{e}\right|$$

$\to (\omega/\omega_0)^2$ $\omega \to \infty$, $$\left|\frac{A}{e}\right|$$

$\to 1$ c mainly affects the size of the peak resonance.

Figure 6A:
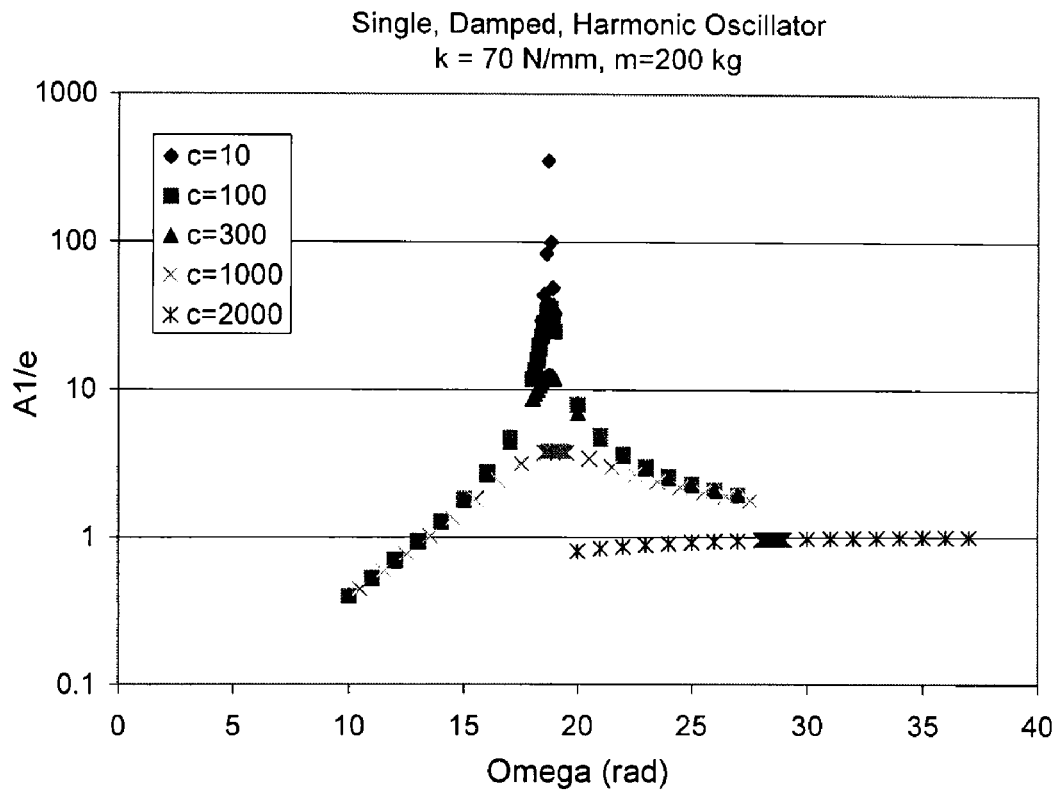
FIG. 6A is a plot of damping on a single mass damped harmonic oscillator.

FIG. 6A is a plot of damping on a single mass damped harmonic oscillator. A mass of 200 kg is oscillated on a spring with a rate of 70 N/mm. Different plots of $A_1/e$ versus oscillation frequency are shown under damping values varied from 10 to 2000 kg/s.

Next an analytical model of two, coupled and damped harmonic oscillators can be developed. This problem is often addressed in texts on mechanics, e.g., see K Symon (1960), pp. 188-197. The system is modeled as a first mass, m1, coupled to a second mass, m2 through both a spring, k1, and a damper, c1, where k1 is the spring coefficient and c1 is the damping coefficient. In turn, the second mass is coupled to a ground state through a second spring, k2 and a second damper, c2. Under the forcing function $F(t)=F_0 e^{i\omega t}$, displacement of the first mass is given by x1 and the displacement of the second mass is given by x2, both in the same direction parallel to the springs and dampers. The motion equations are given as follows.

$$m_1\ddot{x}_1 + c_1(\dot{x}_1-\dot{x}_2) + k_1(x_1-x_2) = F(t) \tag{B1}$$

$$m_2\ddot{x}_2 + c_2\dot{x}_2 + k_2 x_2 - c_1(\dot{x}_1-\dot{x}_2) - k_1(x_1-x_2) = 0 \tag{B2}$$

If $F_0=0$, c1=c2=0, then $$m_2\ddot{x}_1 + k_1(x_1-x_2) = 0 \tag{B3}$$

$$m_2\ddot{x}_2 + (k_1+k_2)x_2 - k_1 x_1 = 0 \tag{B4}$$

Frequencies are now defined for the condition when one mass is held fixed as follows.

$\omega_{10}=\sqrt{k_1/m_1}$, $\omega_{20}=\sqrt{(k_1+k_2)/m_2}=\sqrt{k_2'/m_2}$, where $k_2'=k_1+k_2$.

To derive the solution, apply $x_1=A_1 e^{pt}$, $x_2=A_2 e^{pt}$ $$(m_1 p^2 + k_1)A_1 - k_1 A_2 = 0 \tag{B5}$$

$$(m_2 p^2 + k_2')A_2 - k_1 A_1 = 0 \tag{B6}$$

$$\frac{A_2}{A_1} = \frac{m_1 p^2 + k_1}{k_1} = \frac{k_1}{mp^2 + k_2'} \tag{B7}$$

Solve equation (B7) for the secular equation.

$(m_1 p^2 + k_1)(m_2 p^2 + k_2') - k_1^2 = 0$ $$m_1 m_2 p^4 + (k_1 m_2 + k_2' m_1)p^2 + k_1(k_2'-k_1) = 0 \tag{B8}$$

$$m_1 m_2 p^4 + (k_1 m_2 + k_2' m_1)p^2 + k_1 k_2 = 0 \tag{B8A}$$

$$p^2 = -\frac{1}{2}\left(\frac{k_1}{m_1} + \frac{k_2'}{m_2}\right) \pm \left[\frac{1}{4}\left(\frac{k_1}{m_1} + \frac{k_2'}{m_2}\right)^2 - \frac{k_1 k_2}{m_1 m_2}\right]^{1/2} \tag{B9}$$

$$= -\frac{1}{2}(\omega_{10}^2 + \omega_{20}^2) \pm \left[\frac{1}{4}(\omega_{10}^2 + \omega_{20}^2)^2 - \omega_{10}^2 \omega_2^2\right]^{1/2}$$

$\omega_2^2 = \frac{k_2}{m_2}$ and $\omega_3^2 = \frac{k_1}{m_2}$ $$p^2 = -\frac{1}{2}(\omega_{10}^2 + \omega_{20}^2) \pm \left[\frac{1}{4}(\omega_{10}^2 + \omega_{20}^2)^2 - \omega_{10}^2 \omega_3^2\right]^{1/2}$$

Now showing that $p^2=0$, take the positive sign of the square root and compare by squaring.

$(\omega_{10}^2 + \omega_{20}^2)^2 \stackrel{?}{>} (\omega_{10}^2 - \omega_{20}^2) + 4\omega_{10_3}^2$ $\omega_{10}^2 \omega_{20}^2 \stackrel{?}{>} \omega_{10}^2 \omega_3^2$, so $\omega_{20}^2 \stackrel{?}{>} \omega_3^2$ So it is true that $k_1+k_2>k_1$ The case of interest is $m_1>m_2$, therefore $\omega_{20}>\omega_{10}$.

$$-p^2 = \frac{(\omega_{10}^2 + \omega_{20}^2)}{2} \mp \frac{1}{2}(\omega_{20}^2 - \omega_{10}^2)\left[1 + \frac{4\omega_{10}^2 \omega_3^2}{(\omega_{20}^2 - \omega_{10}^2)^2}\right]^{1/2} \tag{B10}$$

$$\text{Let } \Delta\omega^2 = (\omega_{20}^2 - \omega_{10}^2)\left[\left(1 + \frac{4\omega_{10}^2 \omega_3^2}{(\omega_{20}^2 - \omega_{10}^2)^2}\right)^{1/2} - 1\right] \tag{B11}$$

The two solutions for $-p^2$ are $$-p^2 = \omega_2^2 = \omega_{20}^2 + \frac{1}{2}\Delta\omega^2,$$

the high frequency solution (B12A)

$$-p^2 = \omega_1^2 = \omega_{10}^2 - \frac{1}{2}\Delta\omega^2,$$

the low frequency solution (B12B)

The four solutions are $p=\pm i\omega_1, \pm i\omega_2$

Looking at the high frequency solution yields the following.

$$-p^2 = \omega_2^2 = \omega_{20}^2 - \frac{1}{2}\Delta\omega^2$$

From equation (B7)

$$\frac{A_2}{A_1} = \frac{m_1 p^2 + k_1}{k_1} = 1 + \frac{p^2}{\omega_{10}^2} = 1 - \frac{\omega_{20}^2}{\omega_{10}^2} - \frac{\Delta\omega^2}{2\omega_{10}^2} \quad \text{(B13)}$$

$$\frac{A_2}{A_1} = 1 - \frac{\omega_{20}^2}{\omega_{10}^2} + \frac{\omega_{20}^2 - \omega_{10}^2}{2\omega_{10}^2} - \frac{(\omega_{20}^2 - \omega_{10}^2)}{2\omega_{10}^2}\sqrt{1 + \frac{4\omega_3^2/\omega_3^2}{(\omega_{20}^2 - \omega_{10}^2)}}$$

$$= -\frac{1}{2}\left(\frac{\omega_{20}^2}{\omega_{10}^2} - 1\right)\left[1 + \sqrt{\frac{4\omega_3^2/\omega_{10}^2}{\left(\frac{\omega_{20}^2}{\omega_{10}^2} - 1\right)^2}}\right]$$

The square root term is approximately 1 and $\omega_{20} > \omega_{10}$. Therefore $A_2 > A_1$ and they oscillate out of phase.

$$\frac{A_2}{A_1} = -\frac{1}{2}\left(\frac{\omega_{20}^2}{\omega_{10}^2} - 1\right)\left[1 + \sqrt{1 + \frac{4m_1/m_2}{\left(\frac{\omega_{20}^2}{\omega_{10}^2} - 1\right)^2}}\right] \quad \text{(B14)}$$

With $\omega_{20} \gg \omega_{10}$ $$\frac{A_2}{A_1} \approx -\frac{1}{2}\frac{\omega_{20}^2}{\omega_{10}^2}[1 + \sqrt{1 + \varepsilon}] \approx -\frac{\omega_{20}^2}{\omega_{10}^2} \quad \text{(B15)}$$

Now looking at the low frequency solution yields the following.

$$p^2 = -\omega_1^2 = -\omega_{10}^2 + \frac{1}{2}\Delta\omega^2 \quad \text{(B16)}$$

$$\frac{A_2}{A_1} = 1 + \frac{p^2}{\omega_{10}^2} = \frac{1}{2}\frac{\Delta\omega^2}{\omega_{10}^2} = \frac{1}{2}\left(\frac{\omega_{20}^2}{\omega_{10}^2} - 1\right)\left[\sqrt{1 + \frac{4m_1/m_2}{\left(\frac{\omega_{20}^2}{\omega_{10}^2} - 1\right)^2}} - 1\right]$$

The square root is of form $\sqrt{1+4\epsilon} \approx 2\epsilon$ $$\frac{A_2}{A_1} \approx \frac{1}{2}\left(\frac{\omega_{20}^2}{\omega_{10}^2} - 1\right)\frac{2m_1/m_2}{\left(\frac{\omega_{20}^2}{\omega_{10}^2} - 1\right)^2} \quad \text{(B17)}$$

It is more convenient to take the following.

$$\frac{A_2}{A_1} \approx \frac{m_1}{m_2}\left(\frac{\omega_{20}^2}{\omega_{10}^2} - 1\right) \approx \frac{m_1}{m_2}\frac{(k_1 + k_2)}{m_2}\frac{m_3}{k_2} \approx \frac{m_1^2}{m_2^2}\frac{k_2}{k_1} \quad \text{(B18)}$$

For the low frequency solution, the masses oscillate in phase and $A_1$ has the largest amplitude. The ratio of amplitudes is larger for the low frequency solution compared with the high frequency solution.

A general solution may be determined as follows for $c_1$, $c_2$, $F_0 \neq 0$.

$$m_1\ddot{x}_1 + c_1(\dot{x}_1 - \dot{x}_2) + k_1(x_1 - x_2) = F_0 e^{i\omega t} \quad \text{(C1)}$$

$$m_2\ddot{x}_2 + c_2\dot{x}_2 + k_2 x_2 - c_1(\dot{x}_1 - \dot{x}_2) - k_1(x_1 - x_2) = 0 \quad \text{(C2)}$$

Solutions are of the following form.

$$x_1 = A_1 e^{i\omega t}, \, x_2 = A_2 e^{i\omega t} \quad \text{(C3)}$$

$$-\omega^2 m_1 A_1 + i\omega c_1 A_1 - i\omega c_1 + k_1 A_1 - k_1 A_2 = F_0 \quad \text{(C4)}$$

$$-\omega^2 m_2 A_2 + i\omega c_2 A_2 + k_2 A_2 - i\omega c_1 A_1 + i\omega c_1 A_2 - k_1 A_1 + k_1 A_2 = 0 \quad \text{(C5)}$$

Grouping terms yields the following.

$$A_1(k_1 - \omega^2 m_1 + i\omega c_1) + A_2(-k_1 - i\omega c_1) = F_0$$

$$A_1(-k_1 - i\omega c_1) + A_2(k_2' - \omega^2 m_2 + i\omega c_2') = 0, \text{ where } k_2' = k_1 + k_2 \text{ and } c_2' = c_1 + C_2$$

$$\omega_{10}^2 = \frac{k_1}{m_1}, \, \omega_{20}^2 = \frac{k_2'}{m_2}, \, \omega_3^2 = \frac{k_1}{m_2},$$

and $F_0 = em_1\omega^2$ $$\gamma_1 = \frac{c_1}{m_1}, \, \gamma_2 = \frac{c_2'}{m_2}, \text{ and } \gamma_3 = \frac{c_1}{m_2}$$

$$A_1\left(\frac{\omega_{10}^2}{\omega^2} - 1 + \frac{i\gamma_1}{\omega}\right) + A_2\left(-\frac{\omega_{10}^2}{\omega^2} - \frac{i\gamma_1}{\omega}\right) = e$$

$$A_1\left(\frac{\omega_3^2}{\omega^2} - \frac{i\gamma_3}{\omega}\right) + A_2\left(\frac{\omega_{20}^2}{\omega^2} - 1 + \frac{i\gamma_2}{\omega}\right) = 0$$

Let $D = \begin{vmatrix} \frac{\omega_{10}^2}{\omega^2} - 1 + \frac{i\gamma_1}{\omega} & -\frac{\omega_{10}^2}{\omega^2} - \frac{i\gamma_1}{\omega} \\ -\frac{\omega_3^2}{\omega^2} - \frac{i\gamma_3}{\omega} & \frac{\omega_{20}^2}{\omega^2} - 1 + \frac{i\gamma_2}{\omega} \end{vmatrix}$ (C6)

$$\frac{A_1}{e} = \left(\frac{\omega_{20}^2}{\omega^2} - 1 + \frac{i\gamma_2}{\omega}\right)/D \quad \text{(C7)}$$

$$\frac{A_2}{e} = \left(\frac{\omega_3^2}{\omega^2} + \frac{i\gamma_3}{\omega}\right)/D \quad \text{(C8)}$$

$a_r = \omega_{10}^2/\omega^2 - 1, \, a_i = \gamma_1/\omega$ $b_r = -\omega_{10}^2/\omega^2, \, b_i = -\gamma_1/\omega$ $c_r = -\omega_3^2/\omega^2, \, c_i = -\gamma_3/\omega$ $d_r = \omega_{20}^2/\omega^2 - 1, \, d_i = \gamma_2/\omega$ $D = D_R + iD_I$ $D_R = a_r d_r - a_i d_i - b_r c_r + b_i c_i$ $$D_I = a_i d_r + a_r d_i - b_i c_r - b_r c_i$$

$$A_1 = A_{1r} + iA_{1i} \text{ and } A_2 = A_{2r} + iA_{2i}$$

$$\frac{A_{1r}}{e} = \frac{d_r D_R + d_i D_I}{D_R^2 + D_I^2} \text{ and } \frac{A_{1i}}{e} = \frac{d_i D_R - d_r D_I}{D_R^2 + D_I^2}$$

$$\frac{A_{2r}}{e} = \frac{-c_r D_R - c_i D_I}{D_R^2 + D_I^2} \text{ and } \frac{A_{2i}}{e} = \frac{-c_i D_R + c_r D_I}{D_R^2 + D_I^2}$$

$$\frac{A_1}{e} = \frac{|A_1|}{e} e^{i\delta_1}$$

$$\frac{|A_1|}{e} = \frac{\sqrt{(d_r D_R + d_i D_I)^2 + (d_i D_R - d_r D_I)^2}}{D_R^2 + D_I^2};$$

$$\tan\delta_1 = \frac{d_i D_R - d_r D_I}{d_r D_R + d_i D_I}$$

$$\frac{|A_2|}{e} = \frac{\sqrt{(c_r D_R + c_i D_I)^2 + (c_i D_R - c_r D_I)^2}}{D_R^2 + D_I^2};$$

$$\tan\delta_2 = \frac{c_i D_R - c_r D_I}{c_r D_R + c_i D_I}$$

The resulting equation can be conveniently entered into a spreadsheet (or similar program) to examine the results graphically.

Figure 6B:
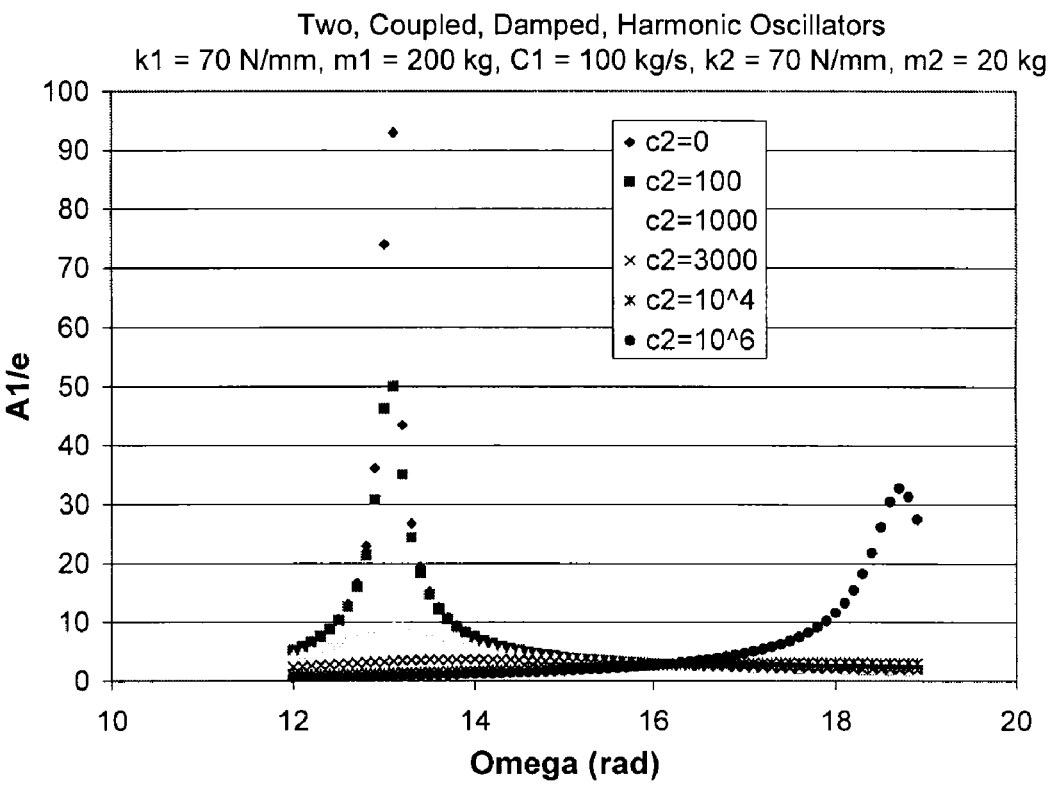
FIGS. 6B-6D are plots of damping on for a dual mass damped harmonic oscillators.
Figure 6C:
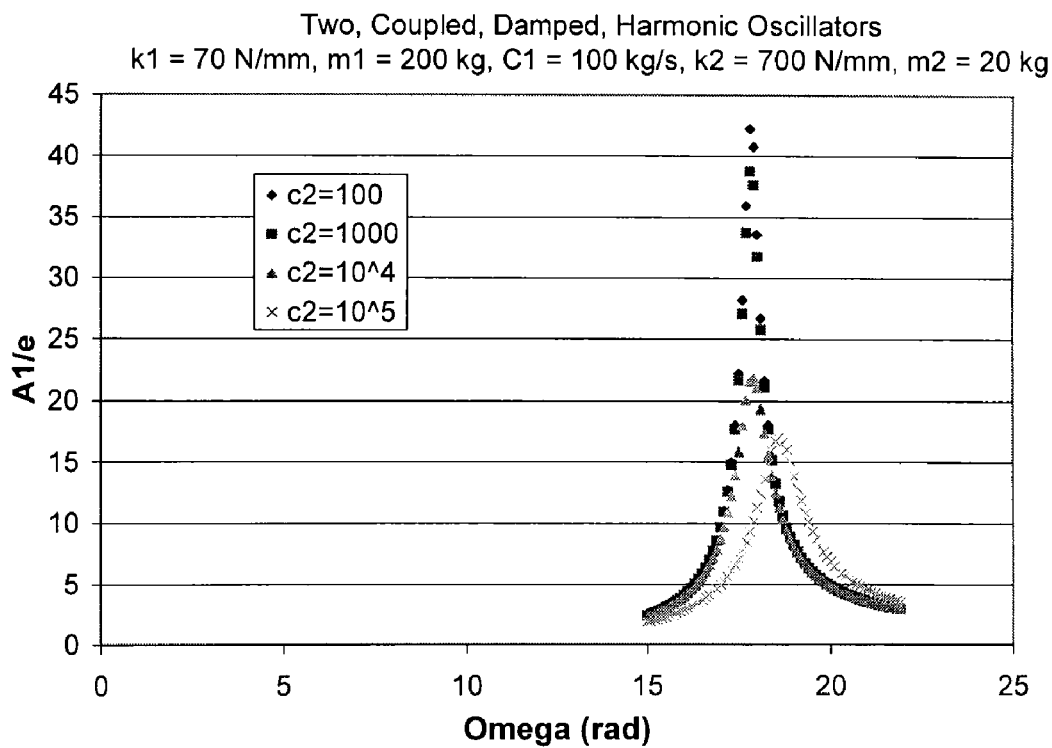
Figure 6D:
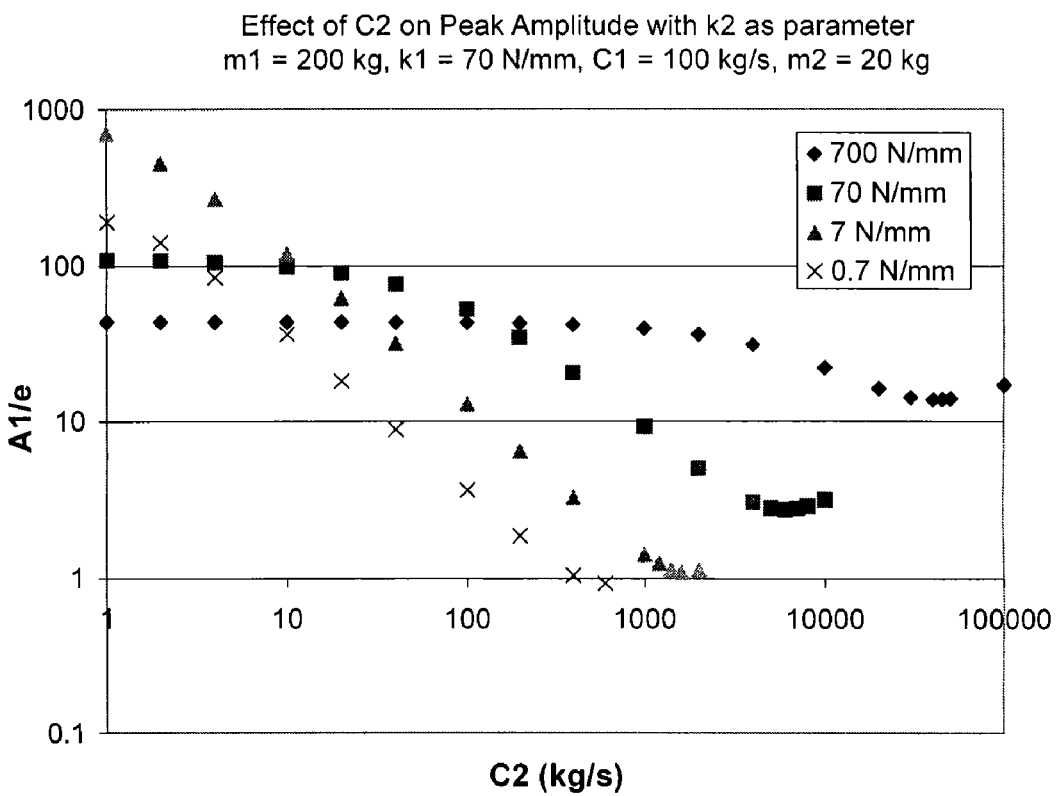

FIGS. 6B-6D are plots of damping on for a dual mass damped harmonic oscillators. FIG. 6B is a plot of A1/e versus frequency for the series connected dual damped oscillators for various damping coefficients c2 (from 0 to $10^6$ kg/s) to ground of the second mass, m2 of 20 kg. The first mass, m1 is 20 kg and the coupling between the masses has a spring rate, k1, of 70 N/mm and a damping coefficient of 100 kg/s. The spring rate, k2 of the second mass coupled to ground is also 70 N/mm. FIG. 6C is a plot of a similar study for a range of c2 from 100 to $10^5$ kg/s the same configuration of dual masses except that k2 is increased to 700 N/mm. Finally, FIG. 6D are different plots of A1/e versus c2 for different values of k2 ranging from 0.7 to 700 N/mm. In a similar manner, with appropriate values of the parameters, these analytical models can be used to describe a superconducting levitation system, such as used in a flywheel, to optimize lateral damping to the stator and improve damping affecting the rotor.

This concludes the description including the preferred embodiments of the present disclosure. The foregoing description including the preferred embodiment of the disclosure has been presented for the purposes of illustration and description. It is not intended to be exhaustive or to limit the embodiments to the precise forms disclosed. Many modifications and variations are possible within the scope of the foregoing teachings. Additional variations of the present disclosure may be devised without departing from the inventive concept as set forth in the following claims.

What is claimed is:

1. An apparatus for damping a superconducting levitation system, comprising:
    a superconducting element generating a magnetic field having a first resonance frequency between the superconducting element and a ground state;
    a magnet supported by the magnetic field generated by the superconducting element relative to a ground state having a second resonance frequency between the magnet and the superconducting element;
    one or more supports for vertically supporting the superconducting element relative to the ground state; and
    a damping strip spanning a gap between the superconducting element and the ground state for providing damped motion such that the first resonance frequency is lower than the second resonance frequency.

2. The apparatus of claim 1, wherein the damped motion is provided substantially perpendicular to support of the magnet by the magnetic field.

3. The apparatus of claim 1, wherein the superconducting element comprises a superconducting stator, the magnet comprises a permanent magnet rotor, and the damped motion of the superconducting stator is substantially radial to the permanent magnet rotor.

4. The apparatus of claim 1, further comprising one or more springs to laterally stabilize the superconducting element along the damped motion of the damping strip.

5. The apparatus of claim 1, wherein the damping strip comprises silicon rubber.

6. The apparatus of claim 1, further comprising a cryostat thermally coupled to the superconducting element to maintain superconductivity of the superconducting element.

7. An apparatus for damping a superconducting levitation system, comprising:
    a superconducting element generating a magnetic field having a first resonance frequency between the superconducting element and a ground state;
    a magnet supported by the magnetic field generated by the superconducting element relative to a ground state having a second resonance frequency between the magnet and the superconducting element; and
    one or more mesh fiber supports, each comprising a mesh fiber column fixed at a first end to the superconducting element and fixed at a second end to the ground state for vertically supporting the superconducting element relative to the ground state and for providing damped motion such that the first resonance frequency is lower than the second resonance frequency.

8. The apparatus of claim 7, wherein the damped motion is provided substantially perpendicular to the magnetic field supporting the magnet.

9. The apparatus of claim 7, further comprising a cryostat thermally coupled to the superconducting element to maintain superconductivity of the superconducting element.

10. The apparatus of claim 7, wherein the superconducting element comprises a superconducting stator, the magnet comprises a permanent magnet rotor, and the damped motion of the superconducting stator is substantially radial to the permanent magnet rotor.

11. The apparatus of claim 7, wherein at least one of the one or more mesh fiber columns comprises a spirally wound mesh fiber material strip.

12. The apparatus of claim 7, wherein at least one of the one or more mesh fiber columns comprises a plurality of substantially concentric mesh fiber cylindrical columns.

13. A method for damping a superconducting levitation system, comprising the steps of:

generating a magnetic field with a superconducting element having a first resonance frequency between the superconducting element and a ground state;

supporting a magnet with the magnetic field generated by the superconducting element relative to a ground state having a second resonance frequency between the magnet and the superconducting element;

supporting the superconducting element vertically relative to the ground state with one or more supports; and damping motion between the superconducting element and the ground state with a damping strip spanning a gap such that the first resonance frequency is lower than the second resonance frequency.

14. The method of claim 13, wherein the damped motion is provided substantially perpendicular to the magnetic field supporting the magnet.

15. The method of claim 13, wherein the superconducting element comprises a superconducting stator, the magnet comprises a permanent magnet rotor, and the damped motion of the superconducting stator is substantially radial to the permanent magnet rotor.

16. The method of claim 13, further comprising one or more springs to laterally stabilize the superconducting element along the damped motion of the damping strip.

17. The method of claim 13, wherein the damping strip comprises silicon rubber.

18. The method of claim 13, further comprising a cryostat thermally coupled to the superconducting element to maintain superconductivity of the superconducting element.

19. A method for damping a superconducting levitation system, comprising the steps of:

generating a magnetic field with a superconducting element having a first resonance frequency between the superconducting element and a ground state;

supporting a magnet with the magnetic field generated by the superconducting element relative to a ground state having a second resonance frequency between the magnet and the superconducting element;

supporting the superconducting element vertically relative to the ground state with one or more mesh fiber supports, each comprising a mesh fiber column fixed at a first end to the superconducting element and fixed at a second end to the ground state; and damping motion between the superconducting element and the ground state with the one or more mesh fiber supports such that the first resonance frequency is lower than the second resonance frequency.

20. The method of claim 19, wherein the damped motion is provided substantially perpendicular to the magnetic field supporting the magnet.

21. The method of claim 19, further comprising a cryostat thermally coupled to the superconducting element to maintain superconductivity of the superconducting element.

22. The method of claim 19, wherein the superconducting element comprises a superconducting stator, the magnet comprises a permanent magnet rotor, and the damped motion of the superconducting stator is substantially radial to the permanent magnet rotor.

23. The method of claim 19, wherein at least one of the one or more mesh fiber columns comprises a spirally wound mesh fiber material strip.

24. The method of claim 19, wherein at least one of the one or more mesh fiber columns comprises a plurality of substantially concentric mesh fiber cylindrical columns.

\* \* \* \* \*